(12) United States Patent  
Pfeiffer

(10) Patent No.: US 9,410,646 B2
(45) Date of Patent: Aug. 9, 2016

(54) METHOD FOR PRODUCING A PIPE CONNECTION BY MEANS OF PRESS FITTING, AND PRESSING TOOL

(71) Applicant: Novopress GmbH Pressen Und Presswerkzeuge & Co. KG, Neuss (DE)

(72) Inventor: Heinrich Pfeiffer, Kaarst (DE)

(73) Assignee: Novopress GmbH Pressen Und Presswerkzeuge & Co. KG, Neuss (DE)

( * ) Notice: Subject to any disclaimer, the term of this patent is extended or adjusted under 35 U.S.C. 154(b) by 173 days.

(21) Appl. No.: 14/364,868

(22) PCT Filed: Dec. 12, 2012

(86) PCT No.: PCT/EP2012/075184
§ 371 (c)(1),
(2) Date: Aug. 27, 2014

(87) PCT Pub. No.: WO2013/087675
PCT Pub. Date: Jun. 20, 2013

(65) Prior Publication Data
US 2015/0013140 A1    Jan. 15, 2015

(30) Foreign Application Priority Data
Dec. 13, 2011   (DE) .................. 10 2011 088 388

(51) Int. Cl.
*F16L 13/14*   (2006.01)
*B21D 39/04*   (2006.01)
*B25B 27/10*   (2006.01)

(52) U.S. Cl.
CPC .............. *F16L 13/141* (2013.01); *B21D 39/04* (2013.01); *B21D 39/048* (2013.01); *B25B 27/10* (2013.01); CPC ................. *F16L 13/142* (2013.01); *F16L 2013/145* (2013.01); *Y10T 29/49927* (2015.01); *Y10T 29/5367* (2015.01)

(58) Field of Classification Search
CPC .... B21D 39/04; B21D 39/048; B21D 39/046; B25B 27/10; F16L 13/141; F16L 13/142; F16L 2013/145; F16L 13/143; Y10T 29/49927; Y10T 29/5367
See application file for complete search history.

(56) References Cited

U.S. PATENT DOCUMENTS 4,624,489 A * 11/1986 Nakamura ............. B21D 39/04
285/382
5,168,618 A * 12/1992 Unewisse ............... B21D 39/04
29/508

(Continued)

FOREIGN PATENT DOCUMENTS

DE    9103264 U1   6/1991
DE    4300934 A1   8/1994

(Continued)

OTHER PUBLICATIONS

International Search Report dated May 13, 2013 for PCT application No. PCT/EP2012/075184.

(Continued)

*Primary Examiner* — Christopher Besler
*Assistant Examiner* — Jun Yoo
(74) *Attorney, Agent, or Firm* — Ohlandt, Greeley, Ruggiero & Perle, L.L.P.

(57) ABSTRACT

In a method for producing a pipe connection by press fitting, the following steps are carried out to increase the burst pressure:
placing a press fitting onto two pipe ends to be connected to one another;
compressing the press fitting against one of the two pipe ends by plastically deforming the press fitting and the pipe end to form a bulge and a first indentation;
once again compressing the press fitting against the same pipe end at a distance (a) from the first compression point by plastically deforming the press fitting and the pipe end, thereby forming a second indentation; and
connecting the press fitting to the second pipe end.

5 Claims, 4 Drawing Sheets

(56) References Cited

U.S. PATENT DOCUMENTS

| | | | |
|---|---|---|---|
| 5,335,530 A | 8/1994 | Homm | |
| 6,481,764 B1* | 11/2002 | Kwok | B21D 39/04 285/382 |
| 9,145,992 B2* | 9/2015 | Arment | F16L 17/02 |

FOREIGN PATENT DOCUMENTS

| | | |
|---|---|---|
| DE | 10007914 C1 | 9/2001 |
| DE | 102006050427 A1 | 2/2008 |
| EP | 0056327 A2 | 7/1982 |
| EP | 0134566 A2 | 3/1985 |
| FR | 882074 A | 5/1943 |
| FR | 2098769 A5 | 3/1972 |
| WO | 9732679 A1 | 9/1997 |

OTHER PUBLICATIONS

Examination Report dated Jun. 22, 2012 for German Application No. 102011088388.6.

* cited by examiner

METHOD FOR PRODUCING A PIPE CONNECTION BY MEANS OF PRESS FITTING, AND PRESSING TOOL

BACKGROUND

1. Field of the Disclosure

The disclosure relates to a method for producing a pipe connection by press fitting and to a pressing tool which is suited, in particular, for carrying out the method.

2. Discussion of the Background Art

In particular for the production of pipe connections it is known to use sleeve-shaped press fittings. These are set on the two pipe ends to be connected and are plastically deformed by means of a pressing tool. In this context, the press fittings are typically made of metal. The inner diameter of the press fitting is chosen slightly larger than the outer diameter of the pipe ends to be connected so that, due to the radial compression, the inner side of the press fitting is pressed against the outer side of the pipe ends and a firm, in particular tight connection is made due to the remaining plastic deformation. The pressing elements, such as the pressing jaws of the pressing tool, have a contour such that, upon compression, a bulge formed in the press fitting is deformed on the one hand, and, on the other hand, a circumferentially extending indentation is formed that is referred to as the strength level. For example, a sealing element can be provided in addition within the bulge.

For example, pressing tools designed in the manner of tongs are used as the pressing tools, said tools comprising at least two pressing elements such as pressing jaws. At least one of the two pressing jaws is connected with a drive means, in particular an electro-hydraulic drive means. Further, pressing tools designed in a sling-like manner are known which are referred to as so-called pressing slings. These comprise a plurality of articulately joined pressing elements of a chain-like design. The pressing elements are placed around the tubular work pieces, i.e. the press fitting arranged on the pipe ends. At the open ends of such press slings, i.e. at the closing point of the pressing sling, a drive means is applied. Using the drive means, the pressing tool is closed, in particular completely, by causing the two end pressing elements, i.e. the two pressing elements between which the closing point is located, to approach each other.

By means of the above described method, such pressing tools can be used to connect two pipe ends, wherein such connections are designed for corresponding burst pressures. Corresponding pipe connections made by means of press fittings are therefore used, for example, in water pipe lines and radiator pipes in the sanitary field.

For higher burst pressures, such as they are required, for example, for pipe connections in sprinkler systems, it is presently common to use a stronger plastic deformation. However, this is disadvantageous in that the inner diameter of the pipes and thus the flow cross section is significantly reduced in the area of the pressed connection.

It is an object of the disclosure to provide a method for producing a pipe connection by means of a press fitting, which ensures high burst pressures. Further, it is an object of the disclosure to provide a pressing tool specifically suited for this purpose.

SUMMARY

In the present method for producing a pipe connection by means of a press fitting, a first step provides that a press fitting is set on two pipe ends to be joined with each other. Thereafter, a pressing tool is used to compress the press fitting onto one of the two pipe ends. Here, the press fitting and the corresponding pipe end are plastically deformed. By the first compression operation, a bulge formed in the press fitting is given another shape and a first indentation is formed which is the so-called first strength level. A sealing ring can be arranged within the bulge. Subsequently, the disclosure provides another compression operation of the press fitting onto the same pipe end, wherein the compression operation is performed at a distance from the first compression point. With respect to the longitudinal direction of the pipe, the two compression points are spaced apart. The second compression operation also causes a plastic deformation of the press fitting and of the pipe end, with a second indentation, i.e. a second strength level, being formed thereby. Thereafter, the press fitting is connected with the second pipe end, which, in a preferred development of the method, is effected in a manner corresponding to the connection between the first pipe end and the press fitting, i.e. by also forming two compression points.

Owing to the forming of two indentations or two strength levels, as provided by the disclosure, it is possible to obtain pipe connections with considerably higher burst pressures at larger flow cross sections.

Preferably, the production of the two compression points per pipe end is effected using the same pressing tool. According to the disclosure, a user of the pressing tool thus preferably does not have use a separate second pressing tool to produce the second strength level. In particular, it is possible to perform all four compression operations with the same tool. In this regard, it is particularly preferred that in each second compression operation only the second indentation is formed. Preferably, a second bulge is not required. However, it is still possible to use the same pressing tool, since the region of the bulge has a larger inner diameter in the pressing tool and, therefore, does not contact the press fitting during the second compression operation.

It is further preferred that the respective second compression operation is performed at a defined distance from the first compression operation. Studies have shown that the achievable burst pressures can thus be increased even further. In this regard, it is preferred that at least one spacer is connected in particular with the pressing tool. In a particularly preferred development, the same is preferably designed such that the at least one spacer is set against or onto the edge or the bulge deformed during the first compression operation.

The pressing tool of the present disclosure, which is particularly suited for executing the method of the present disclosure, for example is a tongs-like pressing tool or a pressing sling. The pressing tool comprises at least two pressing elements or pressing jaws. At least one of the pressing elements is connected with a drive means, in particular an electro-hydraulic drive means, for closing the pressing elements. With a tongs-like pressing tool, it is possible that one of the pressing elements is stationary, while also in this case, the two pressing elements are usually closed or moved towards each other by the drive means. With pressing tools of a sling-like design, so-called pressing slings, a plurality of pressing elements of a chain-like design are provided that are placed around the press fitting, the drive means then being connected with the two end press elements in order to close them for performing the compression operation.

According to the disclosure, the pressing tool comprises at least one spacer for application against a protrusion. The at least one spacer is arranged in the region of the pressing elements. In this regard, the spacer can be connected directly with a mobile or a fixed pressing element or be provided at a separate component. In particular during the execution of the above described method, the spacer is set against a protrusion, especially the bulge deformed during the first compression operation, so that the pressing tool is applied at a defined distance. In this manner, two strength levels can be formed at a defined mutual distance so that high burst pressures can be obtained.

The at least one spacer preferably has a substantially cylindrical basic form and preferably comprises a groove that, in particular, extends circumferentially. Thereby, the spacer can be placed in a simple manner, in particular on the bulge. Here, preferably, the cross section of the groove substantially corresponds to the cross section of the bulge deformed in the first compression operation.

In a further preferred embodiment of the pressing tool of the disclosure, at least two spacers are provided which are arranged in particular opposite each other. Specifically, the two spacers are arranged in an angular range of 160° to 180° relative to the press fitting. Thus, by attaching the spacers in a corresponding manner, it is possible to arrange in particular a pressing sling in a simple manner and in a clearly defined position relative to the bulge. For a further improvement of the position and in order to avoid tilting, it is preferred to provide a third spacer arranged between the two other spacers.

In order to avoid jamming of the spacers or damage to the bulge during a compression operation, the at least one spacer is connected with the pressing tool preferably via an elastic intermediate element. Thereby, it is possible to push the spacer slightly outwards.

In another preferred embodiment of the pressing tool, in particular a tool designed as a pressing sling, the at least one spacer is connected with a component of the pressing tool that is not moved during the compression operation. This is particularly advantageous if at least two spacers are provided that are preferably arranged, in particular opposite each other, on a bracket of a U-shaped cross section. The bracket carrying the two spacers at its ends is pushed over the press fitting from the outer side. Thereby, an incorrect positioning of the pressing tool is avoided.

The following is a detailed description of the disclosure with reference to preferred embodiments.

DETAILED DESCRIPTION OF THE PREFERRED EMBODIMENT

Figure 1:
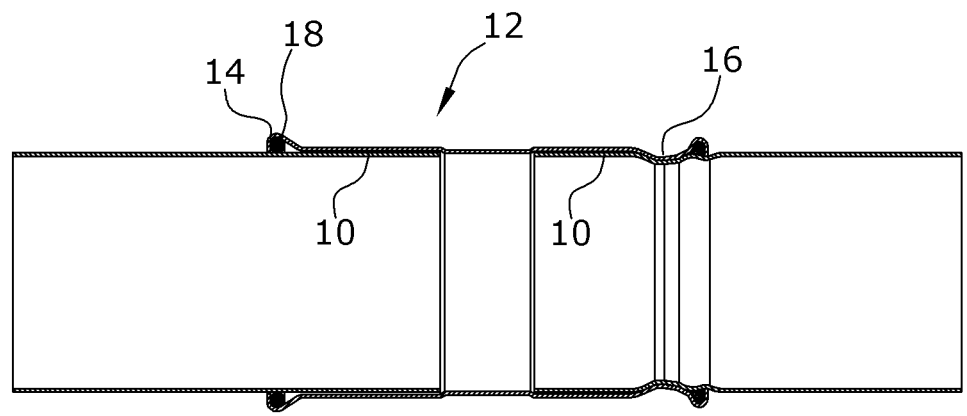
FIG. 1 is a schematic sectional view of a press fitting connection, not compressed on one side and after a first compression operation on the other side.

In a first method step, an initially not deformed press fitting 12 is set onto both pipe ends 10. Thereafter, a first compression operation is performed in which, on the one hand, the bulge 14 is deformed and, on the other hand, the first indentation 16 or the first strength level is formed (FIG. 1). A sealing ring 18 can be arranged within the bulge 14.

Figure 2:
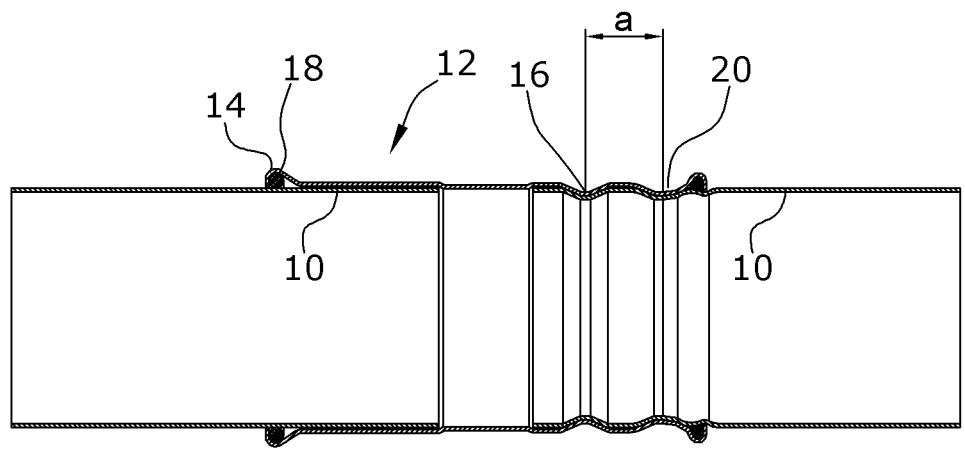
FIG. 2 is a schematic sectional view of a press fitting connection, not compressed on one side and after a first and a second compression operation on the other side.

In the next step, a second indentation 20 or a second strength level is formed at a distance from the bulge 14 by another compression operation (FIG. 2).

The two indentations 16, 20 are arranged at a distance a, seen in the longitudinal direction of the pipe ends 10 to be connected. Thereby, a much higher burst pressure, i.e. a higher internal pressure in the pipe ends 10, can be achieved as compared to a single compression point.

In a preferred embodiment, the second pipe end 10, which is the right end in FIGS. 1 and 2, is compressed in the same manner as the first end 10, as described with reference to FIGS. 1 and 2. In this regard, the order of the pressing steps is not predetermined. For example, the first compression step, in which the bulge 14 and the first indentation 16 are formed, can be executed first with respect to the one pipe end 10 and thereafter with respect to the second pipe end 10. Thereafter, the two second indentations 20 can be formed. Likewise, it is possible to first perform the first and the second compression operation on one pipe end 10 and to subsequently perform the first and the second compression operation on the second pipe end 10.

Figure 3:
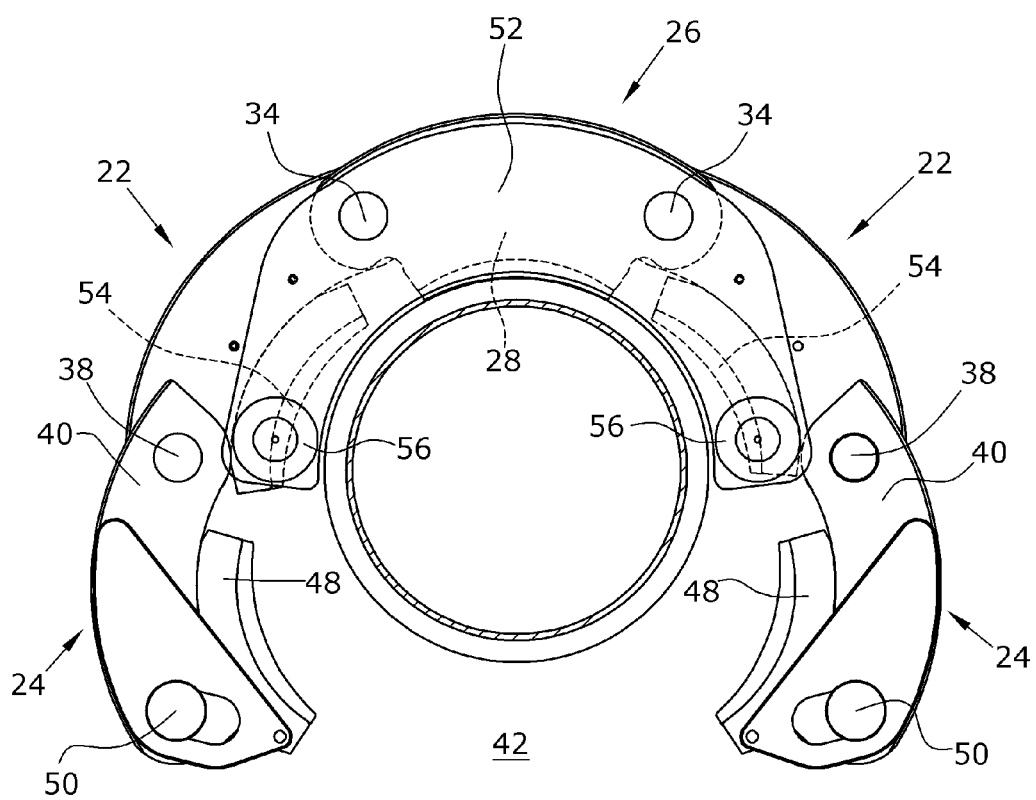
FIG. 3 is a schematical top plan view of a pressing sling of the present disclosure.
Figure 4:
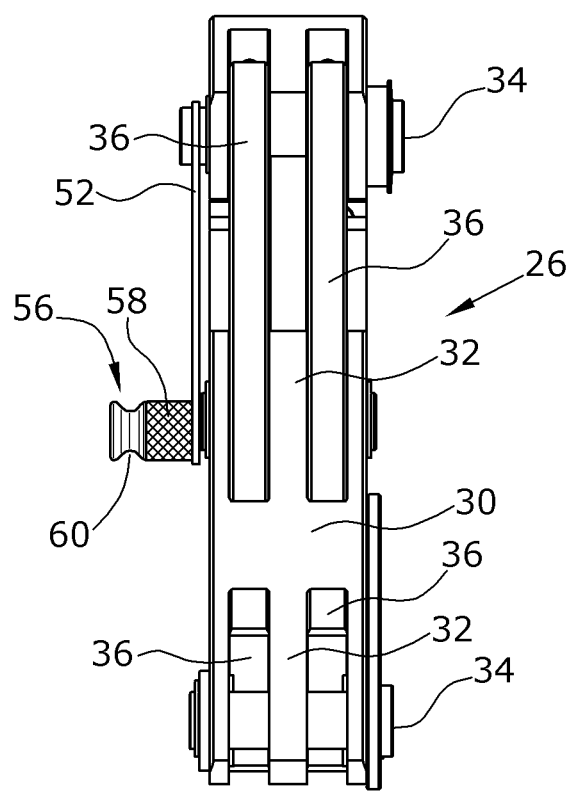
FIG. 4 is a schematical side elevational view of the pressing sling illustrated in FIG. 3.

The compression operation can be performed for example by means of a pressing sling (FIGS. 3 and 4). In the embodiment illustrated, the pressing sling comprises five pressing elements 22, 24, 26, wherein the two pressing elements 24 and the two pressing elements 26 are designed to be mirror-symmetric. The rigid pressing element 22 is designed such that it has a circular segment-shaped surface forming a pressing jaw 28. A base body 30 of the pressing element 26 is integrally connected with two tabs 32. The two pressing elements 22 are pivotably connected with the tabs 32 of the pressing element 26 through bolts 34. The connection is respectively made through a two-piece press jaw carrier 36 (FIG. 4).

The pressing elements 22 are also pivotably connected with the pressing jaw carriers 40 through further bolts 38. The two end pressing elements 24 each form the end of the pressing elements interconnected in a chain-like manner and are not connected with each other in an articulated manner, so that the pressing tool can be guided over the work pieces to be connected.

The two pressing elements 22, which in the embodiment illustrated are the middle elements, are designed such that the pressing jaws are displaceable in the circumferential direction.

In the embodiment illustrated, the two pressing elements 24 also have two pressing jaws 48 that are connected for displacement relative to the respective pressing jaw carrier 40.

The two pressing elements 24 comprise a pin- or stud-shaped protrusion 50. The same is adapted to be connected with a drive means of a pressing tool (FIG. 5) for closing the opening 42. Instead of using the radial pressing tool illustrated in FIG. 5, it is also possible to use an axial pressing tool to close the pressing sling.

According to the disclosure, a U-shaped bracket 52 is firmly connected with the pressing element 26. This can be achieved with separate connecting elements or the bolts 34. At the two arms 54 of the U-shaped bracket 52, a spacer 56 is respectively arranged. Together with the bulge deformed during the first compression operation, the same serves to define the distance between the two indentations 16, 20. In the embodiment illustrated, the two spacers 56 are arranged opposite each other. Possibly, a third spacer can be connected with the U-shaped bracket 52, the spacer being provided in an intermediate region between the two spacers.

Each spacer 56 is connected with the bracket 52 through a preferably elastic intermediate element 58 (FIG. 4). Further, the spacer 56 comprises a groove 60 having dimensions substantially corresponding to the dimensions of the deformed bulge 14.

A drive means 62 (FIG. 5) comprises an in particular electro-hydraulically driven piston element 64 in a housing 66. The hydraulic piston is displaced in the longitudinal direction 68 by means of a hydraulic pump not shown. Via a roller head 70, the force is transmitted to two flanks 72 of two tong elements 74. The two tong elements 74 are connected with each other by a base element 76 carrying two pivot axes 78. By moving the piston element 64 in the longitudinal direction 68, the two tong elements 74 are closed. Since the protrusions or studs 44 of the pressing slings (FIG. 3) are arranged in the recesses 80, the pressing sling is closed by closing the tong elements 74.

Figure 5:
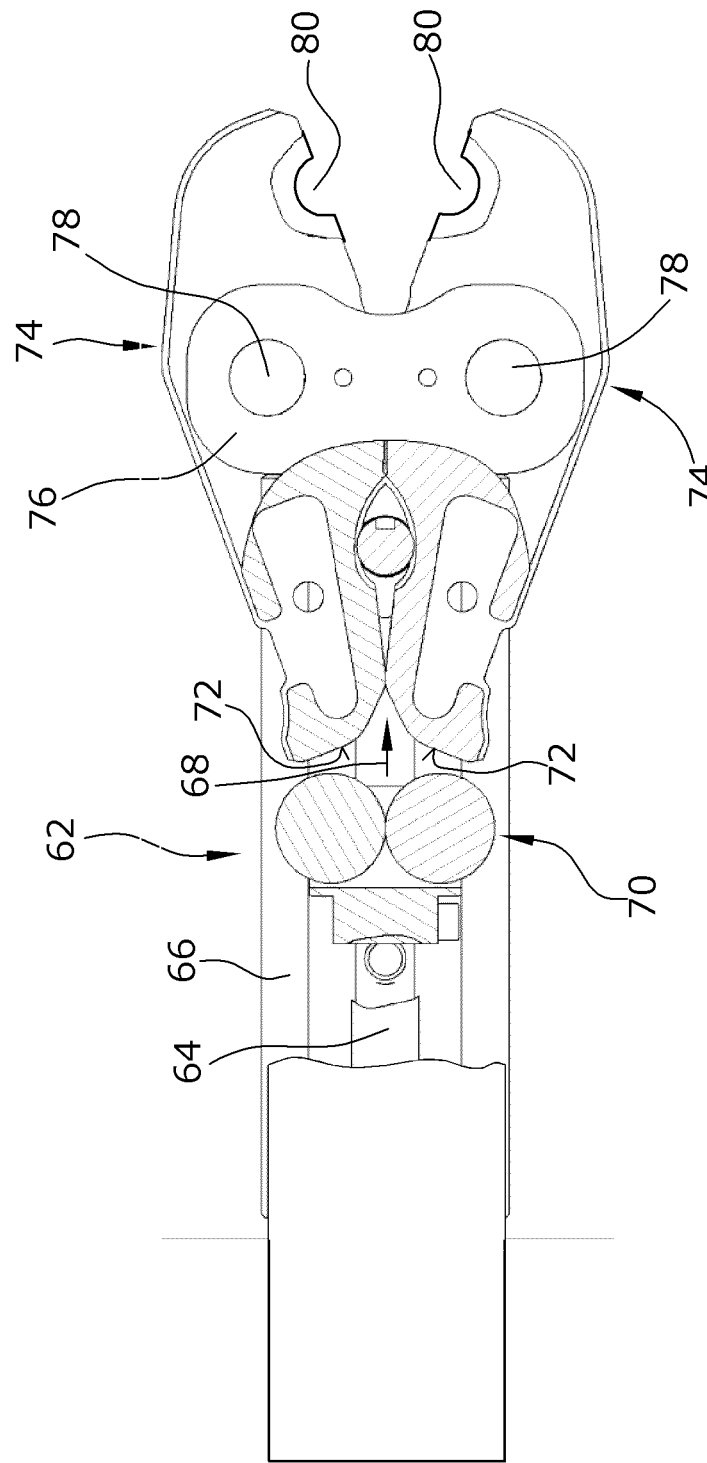
FIG. 5 is a schematical side elevational view of a driving means for connection with the pressing tool.

In particular with smaller diameters of the pipe ends to be connected, it is possible to directly use pressing tongs instead of a pressing sling, the tongs generally being designed like the drive means described with reference to FIG. 5. In this case, the compression operation is effected immediately by means of the two tong elements 74 which form the pressing elements. The fitting is then compressed using recesses 80 of somewhat larger dimensions.

What is claimed is:

1. A method for producing a pipe connection having an increased burst pressure of a press fitting using a pressing tool, wherein the pressing tool comprises at least two pressing elements and a drive means for closing the pressing elements, and wherein the drive means is connected with at least one of the pressing elements, the method comprising placing the press fitting onto two pipe ends to be connected to one another;

compressing the press fitting against one of the two pipe ends by plastically deforming the press fitting and the pipe end to form a bulge and a first indentation;

placing a spacer against the bulge;

repeating compressing the press fitting on the same pipe end at a distance from a first compression point defined by the spacer by plastically deforming the press fitting and the pipe end to form a second indentation; and connecting the press fitting to a second pipe end.

2. The method of claim 1, wherein the two compression operations performed on the same pipe ends are performed using the same pressing tool.

3. The method of claim 1, wherein only the second compression operation serves to form the second indentation.

4. The method of claim 1, wherein the spacer is connected with the pressing tool.

5. The method of claim 1, wherein the second pipe end is compressed with the press fitting in a manner corresponding to the first pipe end.

* * * * *